UNITED STATES PATENT OFFICE.

HERMANN FRIEDMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,022,781.

Specification of Letters Patent. Patented Apr. 9, 1912.

No Drawing. Application filed June 10, 1911. Serial No. 632,413.

*To all whom it may concern:*

Be it known that I, HERMANN FRIEDMANN, citizen of the German Empire, residing at Elberfeld, Germany, have invented new and useful Improvements in New Vat Dye, of which the following is a specification.

My invention relates to the manufacture and production of new vat dyes of the anthracene series having most probably the formula:

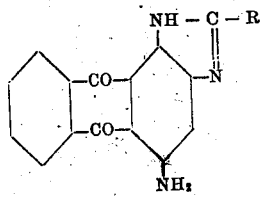

R meaning aryl, such as phenyl, tolyl, xylyl, chlorophenyl, methoxyphenyl, etc.

The new dyes can be obtained by condensing 1.2.4-triaminoanthraquinone with aromatic aldehydes. They are after being dried and pulverized dark powders soluble in pyridin, yielding vats with hydrosulfite and caustic soda lye which vats dye cotton from blue to green shades. They can be acylated by means of acylizing agents, such as acetyl chlorid, benzoyl chlorid, etc., products being thus obtained which are likewise vat dyestuffs dyeing cotton from a hydrosulfite vat generally orange shades.

In order to illustrate the new process more fully the following example is given, the parts being by weight:—To a solution of 1 part of 1.2.4-triaminoanthraquinone in 5 parts of nitrobenzene 1 part of benzaldehyde is added and the mixture is heated during 1 hour to 150° C. until all the 1.2.4-triaminoanthraquinone has disappeared. After cooling the 4-amino-1.2-phenylanthrimidazol separates in needles showing a bluish-metallic luster, which dissolves with a bluish-red coloration in pyridin, with a blue coloration in a 60 per cent. fuming sulfuric acid and with a green-yellow coloration in concentrated sulfuric acid. By the addition of formaldehyde to this solution the color turns into a green. The new condensation product yields a red-brown vat with hydrosulfite and caustic alkali which dyes cotton a greenish-blue fast shade. In order to produce the acyl derivative of this new condensation product, 2 parts of the 4-amino-1.2-phenylanthrimidazol, 20 parts of nitrobenzene and 1 part of benzoylchlorid are heated at 150° C. during 2 hours. The new dyestuff crystallizes from the mixture in red needles, which are filtered off. It dissolves with a reddish-yellow coloration in concentrated sulfuric acid, with a blue-red coloration in fuming sulfuric acid of 60 per cent. It yields a red-brown vat with hydrosulfite and NaOH which dyes cotton in a pure orange shade distinguished by its fastness to light. The new dyestuff thus obtained is the benzoyl compound of the 4-amino-1.2-phenylanthrimidazol the production of which takes place most probably according to the following equations:

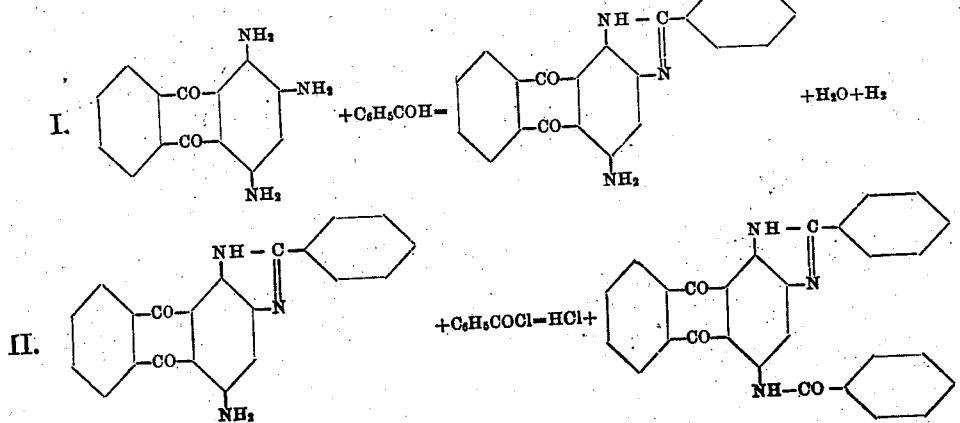

I claim:—

1. The herein described new vat dyestuffs and intermediate products obtainable from 1.2.4-triamino-anthraquinone and aromatic aldehydes being amino-anthrimidazoles having most probably the following general formula:

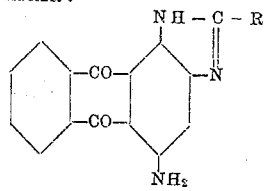

R meaning aryl, which are after being dried and pulverized dark powders soluble in pyridin, yielding vats with hydrosulfite and caustic soda lye, dyeing cotton from blue to green shades; being capable of being acylized in the amino group; products being thus obtained which are likewise vat dyes dyeing cotton from a hydrosulfite vat generally orange shades.

2. The herein described new vat dye having most probably the formula:

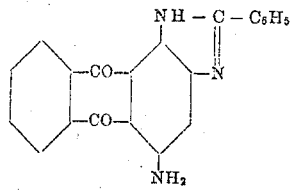

crystallizing in the shape of needles, dyeing cotton from the hydrosulfite vat greenish-blue shades; being converted by treatment with benzoyl chlorid into the benzoyl compound which dyes cotton from the hydrosulfite vat pure orange shades fast to light, substantially as described.

In testimony whereof I have hereunto set my hand in the presence of two subscribing witnesses.

HERMANN FRIEDMANN. [L. S.]

Witnesses:
 ALBERT NUFER,
 ALFRED HENKEL.